United States Patent
Zhou et al.

(10) Patent No.: US 9,237,461 B1
(45) Date of Patent: Jan. 12, 2016

(54) SELECTING ACCESS NODES FOR BROADCAST

(71) Applicant: Sprint Spectrum LP, Overland Park, KS (US)

(72) Inventors: Yu Zhou, Herndon, VA (US); Daniel Vivanco, Sterling, VA (US); Muhammad Naim, Sterling, VA (US); Shahzada Rasool, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 359 days.

(21) Appl. No.: 13/766,484

(22) Filed: Feb. 13, 2013

(51) Int. Cl.
*H04W 24/02* (2009.01)

(52) U.S. Cl.
CPC .................................... *H04W 24/02* (2013.01)

(58) Field of Classification Search
USPC ........................................ 370/252, 328, 331
See application file for complete search history.

(56) References Cited

U.S. PATENT DOCUMENTS

| | | | |
|---|---|---|---|
| 7,054,297 B1* | 5/2006 | Smith | 370/338 |
| 2007/0177555 A1* | 8/2007 | Brueck et al. | 370/338 |
| 2008/0098446 A1* | 4/2008 | Seckin et al. | 725/114 |
| 2011/0026522 A1 | 2/2011 | Hsu | |

* cited by examiner

*Primary Examiner* — Brandon Renner
*Assistant Examiner* — Prince A Mensah

(57) ABSTRACT

In systems and methods of selecting access nodes for broadcast, signal strength metrics are received from a plurality of wireless devices, wherein the signal strength metrics are based on signals received by the plurality of wireless devices from a plurality of access nodes. A first signal strength criteria is determined for each of the wireless devices based on the received signal strength metrics, and wireless devices for which the first signal strength criteria meets a threshold are selected from among the plurality of wireless devices. A second signal strength criteria is determined for each of the plurality of access nodes. A minimum number of the access nodes is selected wherein the second signal strength criteria meets the threshold for each of the selected wireless devices, and a multicast transmission is transmitted from the selected access nodes to the selected wireless devices.

19 Claims, 8 Drawing Sheets

|  | WD 502 | WD 504 | WD 506 | WD 508 | ... | WDn |
|---|---|---|---|---|---|---|
| AN 510 | $p_{11}$ | $p_{12}$ | $p_{13}$ | $p_{14}$ | ... | $p_{1n}$ |
| AN 512 | $p_{21}$ | $p_{22}$ | $p_{23}$ | $p_{24}$ | ... | $p_{2n}$ |
| AN 514 | $p_{31}$ | $p_{32}$ | $p_{33}$ | $p_{34}$ | ... | $p_{3n}$ |
| AN 516 | $p_{41}$ | $p_{42}$ | $p_{43}$ | $p_{44}$ | ... | $p_{4n}$ |
| ... | ... | ... | ... | ... | ... | ... |
| ANm | $p_{m1}$ | $p_{m2}$ | $p_{m3}$ | $p_{m4}$ | ... | $p_{mn}$ |

FIG. 7

SELECTING ACCESS NODES FOR BROADCAST

TECHNICAL BACKGROUND

A wireless communication system can provide a variety of communication services to wireless devices. In addition to interconnect, dispatch, data and other communication services, a wireless communication system can also provide multicast information to wireless devices. An example of a multicast service is the Multimedia Broadcast/Multicast Service (MBMS). A broadcast or multicast service can be provided to a plurality of wireless devices using a time-synchronized signal, which can be transmitted from one or more access nodes of the wireless communication system.

OVERVIEW

In an embodiment, signal strength metrics are received from a plurality of wireless devices, where the signal strength metrics are based on signals received by the plurality of wireless devices from a plurality of access nodes. A first signal strength criteria is determined for each of the wireless devices based on the received signal strength metrics. Wireless devices for which the first signal strength criteria meets a threshold are selected from among the plurality of wireless devices. A second signal strength criteria is determined for each of the plurality of access nodes. A minimum number of the access nodes is selected wherein the second signal strength criteria meets the threshold for each of the selected wireless devices, and a multicast transmission is transmitted from the selected access nodes to the selected wireless devices.

BRIEF DESCRIPTION OF THE DRAWINGS

FIG. 7 illustrates an exemplary signal power matrix.

DETAILED DESCRIPTION

Figure 1:
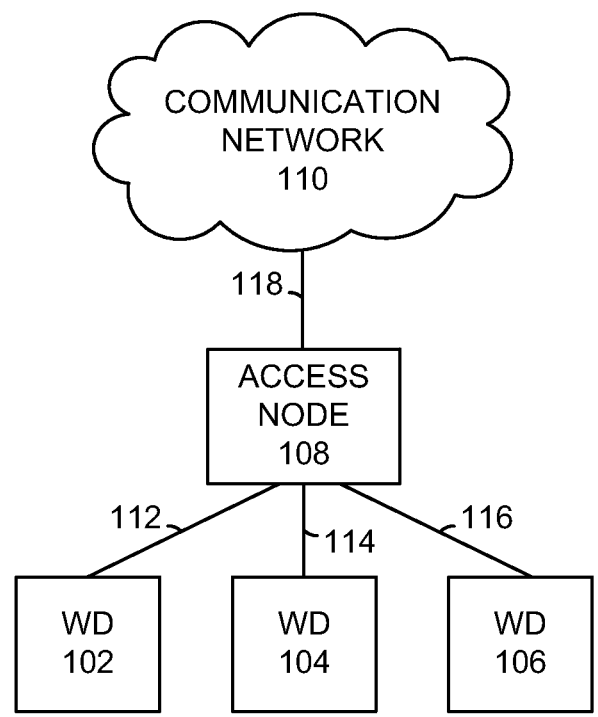
FIG. 1 illustrates an exemplary communication system for broadcast.

FIG. 1 illustrates an exemplary communication system 100 for broadcast comprising wireless devices 102, 104 and 106, access node 108, and communication network 110. Examples of wireless devices 102, 104 and 106 can comprise a cell phone, a smart phone, a computing platform such as a laptop, palmtop, or tablet, a personal digital assistant, or an internet access device, including combinations thereof. Wireless devices 102, 104 and 106 can communicate with access node 108 over communication links 112, 114 and 116, respectively.

Access node 108 is a network node capable of providing wireless communications to wireless devices 102, 104, and 106, and can be, for example, a base transceiver station, a radio base station, an eNodeB device, or an enhanced eNodeB device. Access node 108 is in communication with communication network 110 over communication link 118. While a single access node 108 is illustrated in FIG. 1, this is not intended as a limitation, and it will be appreciated that wireless devices 102, 104 and 106 can communicate with a plurality of access nodes.

Communication network 110 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 110 can be capable of carrying information, for example, to support the delivery of multicast information to wireless devices 102, 104 and 106. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 110 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also comprise additional base stations, controller nodes, telephony switches, internet routers, network gateways, computer systems, communication links, or some other type of communication equipment, as well as combinations thereof.

Communication links 112, 114, 116 and 118 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 108 and communication network 110 which are omitted for clarity, including additional processing nodes, routers, gateways, and physical and/or wireless data links for carrying data among the various network elements.

In an embodiment, signal strength metrics are received from a plurality of wireless devices 102, 104 and 106, where the signal strength metrics are based on signals received by the plurality of wireless devices from a plurality of access nodes (e.g., access node 108). A first signal strength criteria is determined for each of wireless devices 102, 104 and 106 based on the received signal strength metrics. Wireless devices for which the first signal strength criteria meets a threshold are selected from among the plurality of wireless devices 102, 104 and 106. A second signal strength criteria is determined for each of the plurality of access nodes. A minimum number of the access nodes is selected wherein the second signal strength criteria meets the threshold for each of the selected wireless devices, and a multicast transmission is transmitted from the selected access nodes to the selected wireless devices.

Figure 2:
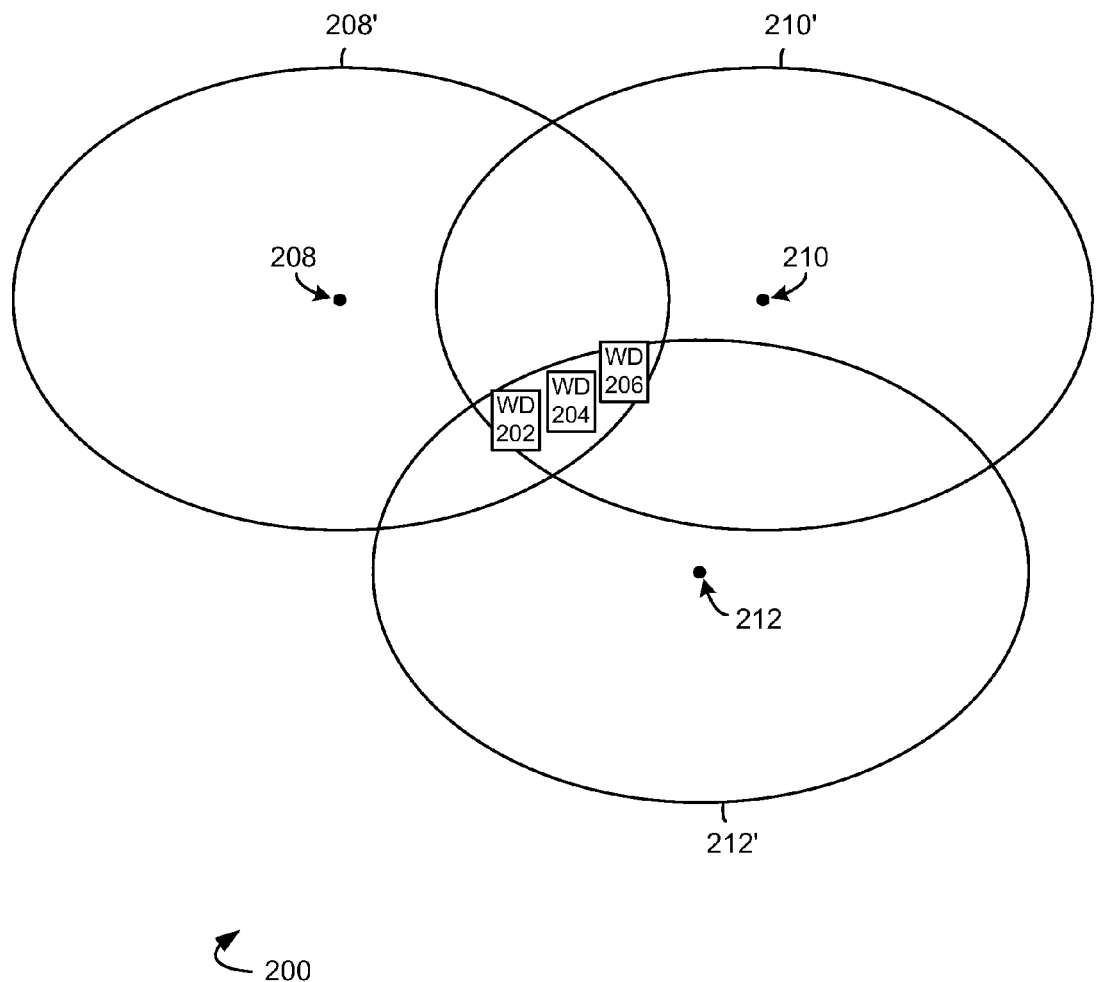
FIG. 2 illustrates another exemplary communication system for broadcast.

FIG. 2 illustrates another exemplary communication system 200 for broadcast, comprising wireless devices 202, 204 and 206 and access nodes 208, 210 and 212. Examples of wireless devices 202, 204 and 206 can comprise a cell phone, a smart phone, a computing platform such as a laptop, palmtop, or tablet, a personal digital assistant, or an internet access device, including combinations thereof. Access nodes 208, 210 and 212 are each a network node capable of providing wireless communications to wireless devices 202, 204 and 206, and can be, for example, a base transceiver station, a radio base station, an eNodeB device, or an enhanced eNodeB device.

Access nodes 208, 210 and 212 each comprise coverage area 208', 210' and 212', respectively, within which each access node can provide wireless communications to a wireless device such as wireless devices 202, 204 and 206. Wireless devices 202, 204 and 206 can communicate with access nodes 208, 210 and 212 over communication links (not illustrated) which can comprise one or more carrier bands or frequency bands.

Communication system 200 can provide a variety of communication services to wireless devices 202, 204 and 206, including multicast (i.e., from one transmission source to multiple receivers) information to wireless devices. One example of a multicast service is the Multimedia Broadcast/Multicast Service (MBMS). In an embodiment, a time-synchronized signal can be transmitted from one or more of access nodes 208, 210 and 212 which can be received by wireless devices 202, 204 and 206. In operation, a multicast transmission sent from access nodes 208, 210 and 212 can be received and interpreted as a single transmission of the multicast information. The multicast transmission can be sent from access nodes 208, 210 and 212 using a single frequency, frequency band, or carrier band. The use of multiple access nodes to multicast information permits over-the-air combining of the multicast transmission, which can improve wireless communication link characteristics such as signal-to-noise ratio (SNR), signal-to-interference-plus-noise ratio (SINR), a carrier-to-interference-plus-noise ratio (CINR), and the like, as compared to non-single frequency transmission. In an embodiment, to permit a receiving wireless device to combine transmissions from different access nodes, a multicast transmission may include a cyclic prefix or other information comprising data repetition, which in an embodiment can be longer than similar information used in non-single frequency transmissions. The numbers of access nodes and wireless devices illustrated in FIG. 2 is merely illustrative, and in operation greater or fewer access nodes and wireless devices can be used in communication system 200.

In operation, a minimum number of access nodes can be selected to broadcast the multicast transmission to reduce an overall network overhead or network load. In one method of selecting access nodes for broadcast, signal strength metrics are received from a plurality of wireless devices (such as wireless devices 202, 204 and 206). The signal strength metrics are based on signals received by wireless devices 202, 204 and 206 from a plurality of access nodes (for example, access nodes 208, 210 and 212). A first signal strength criteria is determined for each of wireless devices 202, 204 and 206 based on the received signal strength metrics. Those wireless devices for which the first signal strength criteria meets a threshold are selected from among the plurality of wireless devices. A second signal strength criteria is determined for each of the plurality of access nodes 208, 210 and 212. A minimum number of the access nodes is selected wherein the second signal strength criteria meets the threshold for each of the selected wireless devices. A multicast transmission is transmitted from the selected access nodes to the selected wireless devices.

Figure 3:
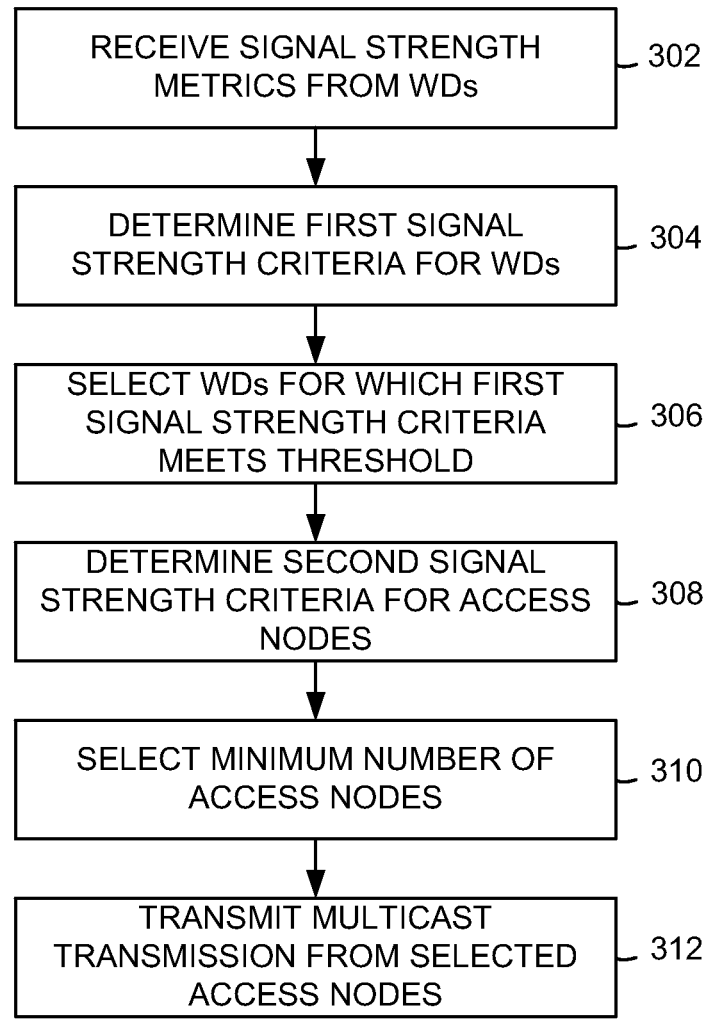
FIG. 3 illustrates an exemplary method of selecting access nodes for broadcast.

FIG. 3 illustrates an exemplary method of selecting access nodes for broadcast. In operation 302, signal strength metrics are received from a plurality of wireless devices based on signals received by the wireless devices from a plurality of access nodes. For example, wireless devices 202, 204 and 206 can receive signals from access nodes 208, 210 and 212 from which a signal power level can be determined. The signals can comprise a control signal, a pilot signal, or some other signal from which a signal power level can be determined. A signal power level can comprise, for example, a signal-to-noise ratio, signal-to-interference-plus-noise ratio, and the like.

In operation 304, a first signal strength criteria is determined for each of the wireless devices based on the received signal strength metrics. For example, for each of wireless devices 202, 204 and 206 a signal strength criteria can be determined based on the received signal strength metrics. When a wireless device can receive a signal from two or more access nodes, the signal strength criteria can be based on more than one received signal. For example, the first signal strength criteria can comprise a sum, an average, or another combination of the signal strength metrics for each wireless device based on the signals received by the wireless devices.

In operation 306, wireless devices for which the first signal strength criteria meets a threshold are selected from among the plurality of wireless devices. For example, a threshold can comprise a minimum service level requirement associated with each of wireless devices 202, 204 and 206. The service level requirement can comprise, for example, a minimum data rate, or a maximum permitted data delay, or a maximum permitted error rate. The service level requirement can also comprise a minimum received signal power, such as a SNR, SINR, CINR, and the like. The service level requirement can be associated with the wireless device, initially provisioned with the wireless device, associated with a subscription account of the wireless device, or otherwise associated with the wireless device in the communication network. The service level requirement can also be associated with an application running on the wireless device. Where a service level requirement is associated with an application running on the wireless device, the wireless device can provide an indication of the application service level requirement to the communication system, or the application service level requirement can be determined by the communication system, for example, by inspection of data packets sent by the wireless device. Other service level requirements are also possible, including combinations of the foregoing. Wireless devices for which the first signal strength criteria meets a threshold can be selected from among the plurality of wireless devices. For example, wireless devices 202, 204 and 206 can be selected.

In operation 308, a second signal strength criteria is determined for each of the plurality of access nodes. For example, based on the signal strength metrics received from each of wireless devices 202, 204 and 206, a second signal strength criteria can be determined for each of access nodes 208, 210 and 212. The second signal strength criteria can comprise, for example, signal levels received at wireless devices 202, 204 and 206 from each of access nodes 208, 210 and 212, to provide an indication of a service level which each access node can provide to one or more of wireless devices 202, 204 and 206. The service level provided by each access node can be, for example, a minimum data rate, or a maximum permitted data delay, or a maximum permitted error rate, or it can be a minimum received signal power, such as a SNR, SINR, CINR, and the like. When a signal from an access node is received by more than one wireless device, the second signal strength criteria can be based on more than one received signal. For example, the second signal strength criteria can comprise a sum, an average, or another combination of the signal strength metrics for each access node based on the signals received by the wireless devices.

In operation 310, a minimum number of the access nodes is selected wherein the second signal strength criteria meets the threshold for each of the selected wireless devices. For example, a number of access nodes can be selected from among access nodes 208, 210 and 212 for which the second signal strength criteria meets the threshold for each of the selected wireless devices. Where wireless devices 202, 204 and 206 have been selected, a number of access nodes can be selected from among access nodes 208, 210 and 212 to provide a minimum level of service to the selected wireless devices. Based on the second signal strength criteria and the threshold, one or more access nodes can be selected from among access nodes 208, 210 and 212. The selection of a minimum number of access nodes for which the second signal strength criteria meets the threshold for each of the selected wireless devices permits efficient use of network resources, including processing resources at network elements and communication link resources both between access nodes and wireless devices as well as access nodes and other network elements. For example, access nodes 208 and 210 can be selected, even though wireless devices 202, 204 and 206 are within a coverage areas 208', 210' and 212' of access nodes 208, 210 and 212. In operation 312, a multicast transmission is transmitted from the selected access nodes to the selected wireless devices. For example, a multicast transmission can be transmitted from selected access nodes 208 and 210 to selected wireless devices 202, 204 and 206.

Figure 4:
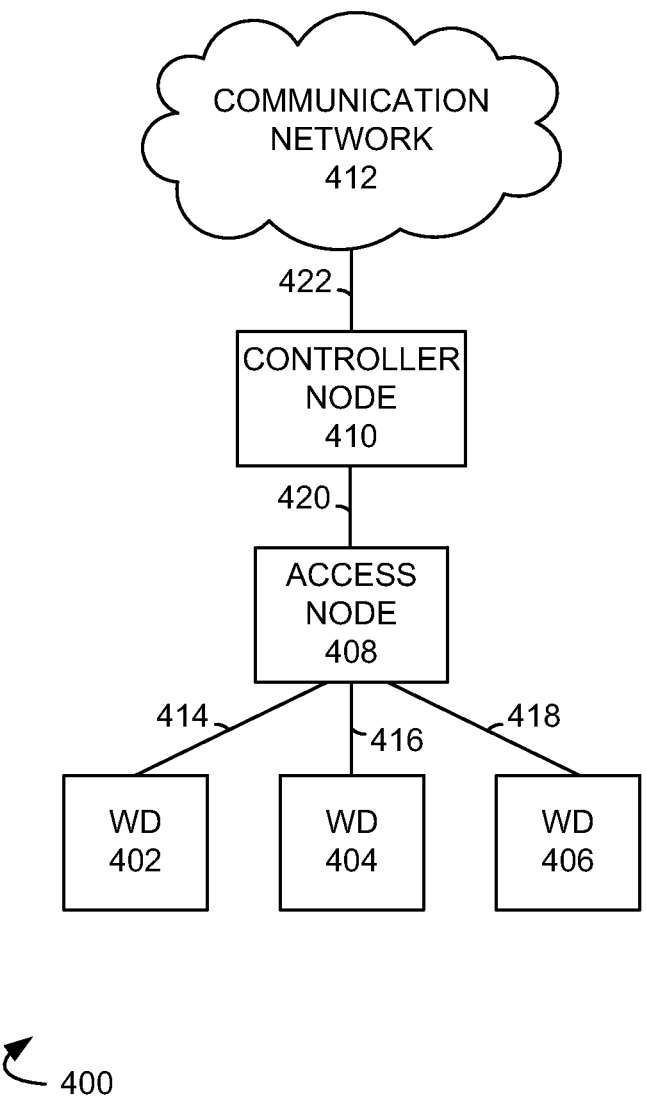
FIG. 4 illustrates another exemplary communication system for broadcast.

FIG. 4 illustrates another exemplary communication system 400 for broadcast comprising wireless devices 402, 404 and 406, access node 408, controller node 410, and communication network 412. Examples of wireless devices 402, 404 and 406 can comprise a cell phone, a smart phone, a computing platform such as a laptop, palmtop, or tablet, a personal digital assistant, or an internet access device, including combinations thereof. Wireless devices 402, 404 and 406 can communicate with access node 408 over communication links 414, 416 and 418, respectively.

Access node 408 is a network node capable of providing wireless communications to wireless devices 402, 404 and 406, and can be, for example, a base transceiver station, a radio base station, an eNodeB device, or an enhanced eNodeB device. Access node 408 is in communication with controller node 410 over communication link 420.

Controller node 410 is a network element which can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. The software can comprise computer-executable instructions for selecting access nodes for broadcast. Controller node 410 can further control the setup and maintenance of a communication session over communication network 412 by wireless devices 402, 404 and 406. Controller node 410 can comprise a mobile switching center (MSC), a dispatch call controller (DCC), a mobility management entity (MME), or other similar network node.

Controller node 410 can be for example, a standalone computing device or network element, or the functionality of controller node 410 can be included in another network node such as a gateway, a proxy node, a home location register (HLS), a home subscriber server (HSS), or other network node capable of supporting the appropriate functionality. The functionality of controller node 410 can also be incorporated into, or may be distributed across, two or more network elements. Controller node 410 is in communication with communication network 412 over communication link 422.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 can be capable of carrying information, for example, to support the delivery of multicast information to wireless devices 402, 404 and 406. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 412 may also comprise additional base stations, controller nodes, telephony switches, internet routers, network gateways, computer systems, communication links, or some other type of communication equipment, as well as combinations thereof.

Communication links 414, 416, 418, 420 and 422 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 408, controller node 410 and communication network 412 which are omitted for clarity, including additional processing nodes, routers, gateways, and physical and/or wireless data links for carrying data among the various network elements.

Figure 5:
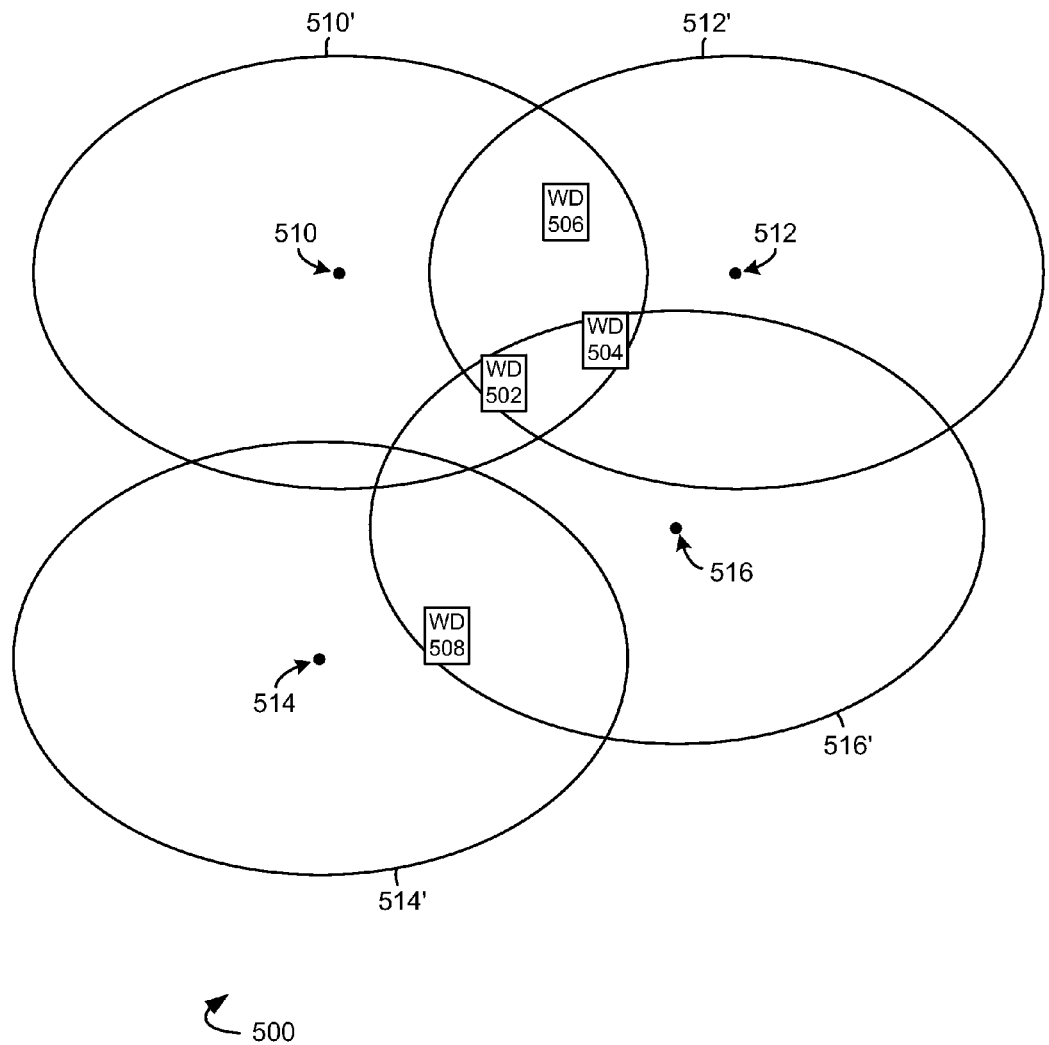
FIG. 5 illustrates another exemplary communication system for broadcast.

FIG. 5 illustrates another exemplary communication system for broadcast, comprising wireless devices 502, 504, 506 and 508, and access nodes 510, 512, 514 and 516. Examples of wireless devices 502, 504, 506 and 508 can comprise a cell phone, a smart phone, a computing platform such as a laptop, palmtop, or tablet, a personal digital assistant, or an internet access device, including combinations thereof. Access nodes 510, 512, 514 and 516 are each a network node capable of providing wireless communications to wireless devices 502, 504, 506 and 508, and can be, for example, a base transceiver station, a radio base station, an eNodeB device, or an enhanced eNodeB device.

Access nodes 510, 512, 514 and 516 each comprise coverage area 510', 512', 514' and 516', respectively, within which each access node can provide wireless communications to a wireless device such as wireless devices 502, 504, 506 and 508. Wireless devices 502, 504, 506 and 508 can communicate with access nodes 510, 512, 514 and 516 over communication links (not illustrated) which can comprise one or more carrier bands or frequency bands.

Communication system 500 can provide a variety of communication services to wireless devices 502, 504, 506 and 508, including multicast (i.e., from one transmission source to multiple receivers) information to wireless devices. One example of a multicast service is the Multimedia Broadcast/Multicast Service (MBMS). In an embodiment, a time-synchronized signal can be transmitted from one or more of access nodes 510, 512, 514 and 516 which can be received by wireless devices 502, 504, 506 and 508. In operation, a multicast transmission sent from access nodes 510, 512, 514 and 516 can be received and interpreted as a single transmission of the multicast information. The multicast transmission can be sent from access nodes 510, 512, 514 and 516 using a single frequency, frequency band, or carrier band. The use of multiple access nodes to multicast information permits over-the-air combining of the multicast transmission, which can improve wireless communication link characteristics such as signal-to-noise ratio (SNR), signal-to-interference-plus-noise ratio (SINR), a carrier-to-interference-plus-noise ratio (CINR), and the like, as compared to non-single frequency transmission. In an embodiment, to permit a receiving wireless device to combine transmissions from different access nodes, a multicast transmission may include a cyclic prefix or other information comprising data repetition, which in an embodiment can be longer than used in non-single frequency transmissions. The numbers of access nodes and wireless devices illustrated in FIG. 5 is merely illustrative, and in operation greater or fewer access nodes and wireless devices can be used in communication system 500.

Figure 6:
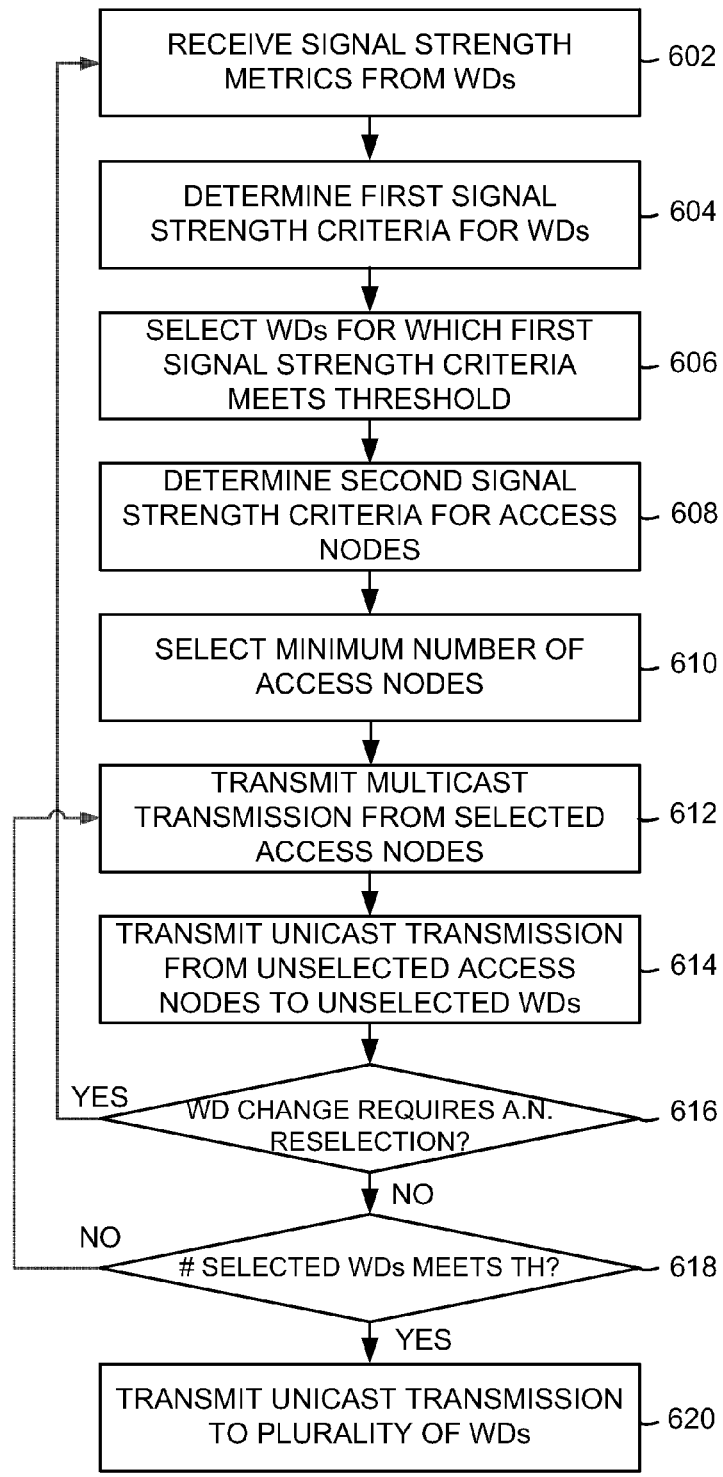
FIG. 6 illustrates another exemplary method of selecting access nodes for broadcast.

FIG. 6 illustrates another exemplary method of selecting access nodes for broadcast. In operation 602, signal strength metrics are received from a plurality of wireless devices based on signals received by the wireless devices from a plurality of access nodes. For example, wireless devices 502 and 504, which are within coverage areas 510', 512' and 516', can receive signals from access nodes 510, 512, and 516. Wireless device 506, which is within coverage areas 510' and 512', can receive signals from access nodes 510 and 512. Wireless device 508, which is within coverage areas 514' and 516', can receive signals from access nodes 514 and 516. The signals can comprise a control signal, a pilot signal, or some other signal from which a signal power level can be determined. A signal power level can comprise, for example, a signal-to-noise ratio, signal-to-interference-plus-noise ratio, and the like. In an embodiment, the signal strength metrics can be received at a network element such as controller node 410, or another appropriately configured network element. In an embodiment, the signal strength metrics can be re-evaluated periodically, so that signal strength metrics are received during a first time period, a second time period, and so forth.

In operation 604, a first signal strength criteria is determined for each of the wireless devices based on the received signal strength metrics. For example, for each of wireless devices 502, 504, 506 and 508 a signal strength criteria can be determined based on the received signal strength metrics. When a wireless device can receive a signal from two or more access nodes, the signal strength criteria can be based on more than one received signal. For example, the first signal strength criteria can comprise a sum, an average, or another combination of the signal strength metrics for each wireless device based on the signals received by the wireless devices, so that, for example, a signal strength criteria for wireless devices 502 and 504 can be based on signals received from access nodes 510, 512 and 516. Similarly, a signal strength criteria for wireless device 506 can be based on signals received from access nodes 510 and 512, and a signal strength criteria for wireless device 508 can be based on signals received from access nodes 514 and 516.

In operation 606, wireless devices for which the first signal strength criteria meets a threshold are selected from among the plurality of wireless devices. For example, a threshold can comprise a minimum service level requirement associated with each of wireless devices 502, 504, 506 and 508. The service level requirement can comprise, for example, a minimum data rate, or a maximum permitted data delay, or a maximum permitted error rate. The service level requirement can also comprise a minimum received signal power, such as a SNR, SINR, CINR, and the like. The service level requirement can be associated with the wireless device, initially provisioned with the wireless device, or associated with a subscription account of the wireless device, or otherwise associated with the wireless device in the communication network. The service level requirement can also be associated with an application running on the wireless device. Where a service level requirement is associated with an application running on the wireless device, the wireless device can provide an indication of the application service level requirement to the communication system, or the application service level requirement can be determined by the communication system, for example, by inspection of data packets sent by the wireless device. Other service level requirements are also possible, including combinations of the foregoing. Wireless devices for which the first signal strength criteria meets a threshold can be selected from among the plurality of wireless devices. For example, wireless devices 502, 504 and 506 can be selected, while wireless device 508 may not be selected.

In operation 608, a second signal strength criteria is determined for each of the plurality of access nodes. For example, based on the signal strength metrics received from each of wireless devices 502, 504, 506 and 508, a second signal strength criteria can be determined for each of access nodes 510, 512, 514 and 516. The second signal strength criteria can comprise, for example, signal levels received at wireless devices 502, 504, 506 and 508 from each of access nodes 510, 512, 514 and 516, to provide an indication of a service level which each access node can provide to one or more of wireless devices 502, 504, 506 and 508. The service level provided by each access node can be, for example, a minimum data rate, or a maximum permitted data delay, or a maximum permitted error rate, or it can be a minimum received signal power, such as a SNR, SINR, CINR, and the like. When a signal from an access node is received by more than one wireless device, the second signal strength criteria can be based on more than one received signal. For example, the second signal strength criteria can comprise a sum, an average, or another combination of the signal strength metrics for each access node based on the signals received by the wireless devices.

In operation 610, a minimum number of the access nodes is selected wherein the second signal strength criteria meets the threshold for each of the selected wireless devices. For example, a number of access nodes can be selected from among access nodes 510, 512, 514 and 516 for which the second signal strength criteria meets the threshold for each of the selected wireless devices. Where wireless devices 502, 504 and 506 have been selected, a number of access nodes can be selected from among access nodes 510, 512, 514 and 516 to provide a minimum level of service to the selected wireless devices, based on the second signal strength criteria and the threshold. The selection of a minimum number of access nodes for which the second signal strength criteria meets the threshold for each of the selected wireless devices permits efficient use of network resources, including processing resources at network elements and communication link resources both between access nodes and wireless devices as well as access nodes and other network elements. For example, access nodes 510 and 512 can be selected, even though wireless devices 502 and 504 are within a coverage areas 510', 512' and 516' of access nodes 510, 512 and 516. In operation 612, a multicast transmission is transmitted from the selected access nodes to the selected wireless devices. For example, a multicast transmission can be transmitted from selected access nodes 510 and 512 to selected wireless devices 502, 504 and 506.

In an embodiment, a list or a matrix of the received signal strength metrics can be generated to determine the first and second signal strength criteria. For example, FIG. 7 illustrates an exemplary signal strength matrix. Signal strength metrics $p_{11}$-$p_{mn}$ can be received from a plurality of wireless devices, including wireless device 502, 504, 506 and 508, where m indicates a number of access nodes, and where n indicates a number of wireless devices. A first signal strength criteria for wireless device 502 can be based on signal strength metrics $p_{11}, p_{21}, p_{31}, p_{41}, \ldots p_{m1}$, corresponding with signals received from access nodes 510, 512, 514, 516 . . . up to a last access node m (not illustrated). Where a signal is not received from an access node, for example, where wireless device 502 is not within coverage area 514', the lack of signal can be indicated appropriately. Similarly, a first signal strength criteria for wireless device 504 can be based on signal strength metrics $p_{12}, p_{22}, p_{32}, p_{42}, \ldots p_{m2}$, and so forth. In an embodiment, the first signal strength criteria can comprise a sum of the signal strength metrics for each wireless device based on the signals received by the wireless devices. For example, the first signal strength criteria for wireless device 504 can be a sum of signal strength metrics $p_{12}, p_{22}, p_{32}, p_{42}, \ldots p_{m2}$.

Additionally, a second signal strength criteria can be determined for access node 510 based on signal strength metrics $p_{11}, p_{12}, p_{13}, p_{14}, \ldots p_{1n}$, corresponding with signals received by wireless devices 502, 504, 506 and 508 from access node 510. Where a signal is not received from access node 510, the lack of signal can be indicated appropriately. In an embodiment, the second signal strength criteria can comprise a sum of the signal strength metrics for each access node based on the signals received by the wireless devices. For example, the second signal strength criteria for access node 510 can comprise a sum of signal strength metrics $p_{11}, p_{12}, p_{13}, p_{14}, \ldots p_{1n}$.

Returning to FIG. 6, in operation 614 a unicast transmission is transmitted from the access nodes which are not selected to the wireless devices which are not selected from among the plurality of wireless devices. For example, where wireless device 508 is not selected, and access nodes 514 and 516 are not selected, one of access nodes 514 and 516 can be selected to transmit a unicast transmission to wireless device 508. The unicast transmission can deliver substantially the same information to wireless device 508 as the multicast transmission delivers to wireless devices 502, 504 and 506.

In operation 616, it is determined whether a change has occurred related to wireless devices 502, 504, 506 and 508. For example, a new wireless device can enter one or more of coverage area 510', 512', 514' and 516', because the new wireless device is mobile, or because the new wireless device is powered on, or because the wireless device emerges from a coverage hole or other area of poor coverage, and the like. Further, the new wireless device can receive the multicast transmission from one or more of the selected access nodes. A signal strength criteria can be determined for the new wireless device based on a signal strength metric received from the new wireless device. When the signal strength criteria for the new wireless device meets the threshold (or when no change is detected among the wireless devices), then the selected access nodes can be used to provide the multicast transmission to the selected wireless devices and the new wireless device, and no change in the selected access nodes is required (operation 616—NO).

In operation 616—YES, when the signal strength criteria for the new wireless device does not meet a threshold (for example, similar to the threshold described above with respect to operation 606), then access nodes to transmit the multicast transmission can be reselected. As another example, when a wireless device leaves the one or more coverage areas 510', 512', 514' and 516', or when a wireless device stops receiving the multicast transmission, access nodes to transmit the multicast transmission can be reselected.

In operation 618, when a number of the selected wireless devices meets a wireless device threshold (operation 618—YES), the transmission of the multicast transmission can be stopped and the content can be transmitted to wireless devices using unicast transmissions. For example, a threshold number of served wireless devices can be required for transmission of the multicast transmission (for example, a minimum number). When a decrease in the number of selected wireless devices occurs, for example, when a wireless device leaves the coverage areas 510', 512', 514' and 516', or is powered off, or when a wireless device otherwise stops receiving the multicast transmission, it can be determined that the number of remaining wireless devices meets the threshold. In such case, the transmission of the multicast transmission can be stopped and the content can be transmitted to wireless devices using unicast transmissions (operation 620).

Figure 8:
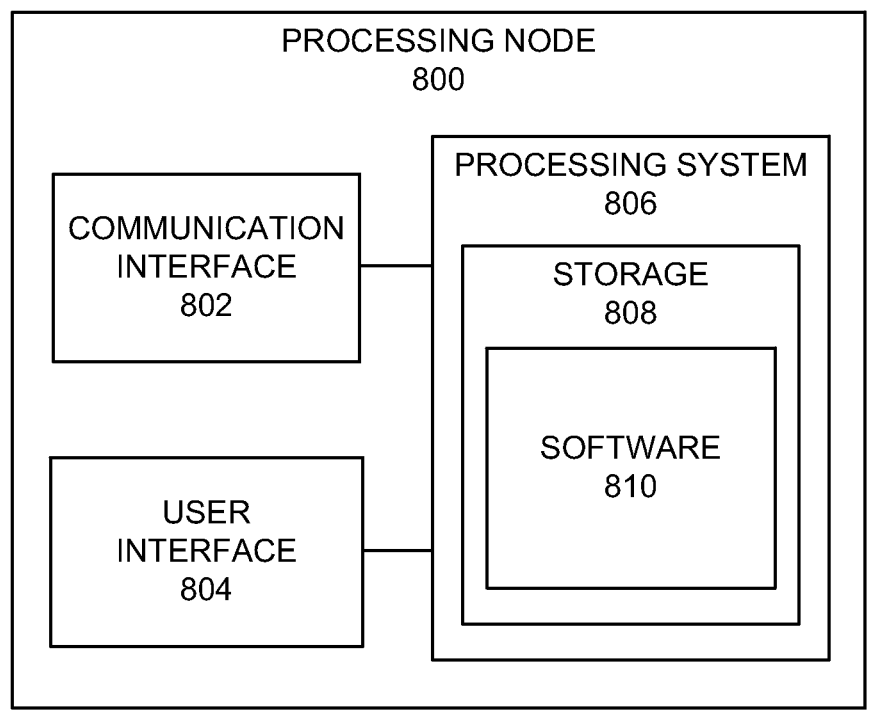
FIG. 8 illustrates an exemplary processing node.

FIG. 8 illustrates an exemplary processing node 800 in a communication system. Processing node 800 comprises communication interface 802, user interface 804, and processing system 806 in communication with communication interface 802 and user interface 804. Processing node 800 is capable of selecting access nodes for broadcast. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. Software 810 may include computer programs, firmware, or some other form of machine-readable instructions, including an operating system, utilities, drivers, network interfaces, applications, or some other type of software. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

Examples of processing node 800 include controller node 410. Processing node 800 can also be an adjunct or component of a network element, such as an element of access nodes 108, 208, 210, 212, 408, 510, 512, 514 and/or 516. Processing node 800 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of selecting access nodes for broadcast, comprising:
   receiving signal strength metrics associated with a plurality of access nodes and determining, based on the received signal strength metrics, a first signal strength criteria for each of a plurality of wireless devices;
   selecting, from the plurality of wireless devices, those wireless devices for which the first signal strength criteria meets a first signal strength threshold;
   determining, based on the first signal strength threshold, a second signal strength criteria for each of the plurality of access nodes and selecting, from the plurality of access nodes, a minimum number of access nodes that meet the first signal strength threshold and the second signal strength criteria;
   transmitting a multicast transmission from the selected access nodes to the selected wireless devices;
   detecting, based on the received signal strength metrics, a change in the selected wireless devices that requires re-selection of the access nodes and re-determining the first signal strength criteria for each of the plurality of wireless devices;
   re-selecting those wireless devices for which the re-determined first signal strength criteria meets a second signal strength threshold; and
   re-determining, based on the second signal strength threshold, the second signal strength criteria and re-selecting, from the plurality of access nodes, the minimum number of access nodes that meet the re-determined second signal strength threshold and the second signal strength criteria.

2. The method of claim 1, wherein the first signal strength criteria further comprises a sum of the signal strength metrics for each wireless device based on signals received by the wireless devices.

3. The method of claim 1, wherein the second signal strength criteria further comprises a sum of the signal strength metrics for each access node based on signals received by the wireless device.

4. The method of claim 1, wherein the selected access nodes transmit the multicast transmission over a frequency shared by the plurality of access nodes.

5. The method of claim 1, further comprising determining the first signal strength criteria for each of the wireless devices based on the signal strength metrics received during a first time period.

6. The method of claim 1, further comprising:
   transmitting a unicast transmission from the plurality of access nodes which are not selected.

7. The method of claim 1, further comprising:
   transmitting a unicast transmission to the wireless devices which are not selected from among the plurality of wireless devices.

8. The method of claim 1, further comprising:
   when a number of the selected wireless devices changes, repeating the method.

9. The method of claim 8, further comprising:
   when a number of the selected wireless devices meets a wireless device threshold, repeating the method.

10. The method of claim 8, further comprising:
    when a number of the selected wireless devices meets a wireless device threshold, transmitting a unicast transmission to the plurality of wireless devices from the selected access nodes.

11. The method of claim 1, further comprising:
    receiving from a new wireless device signal strength metrics based on signals received by the new wireless device from the plurality of access nodes;
    determining that a signal strength criteria for the new wireless device does not meet the first signal strength threshold;
    re-determining the first signal strength criteria for each of the wireless devices based on the received signal strength metrics;
    selecting from among the plurality of wireless devices and the new wireless device those wireless devices comprising a signal strength criteria which meets a third signal strength threshold;
    re-determining the second signal strength criteria for each of the plurality of access nodes;
    selecting a minimum number of the access nodes wherein the second signal strength criteria meets the third signal strength threshold for each of the selected wireless devices; and
    transmitting a multicast transmission from the selected access nodes to the selected wireless devices.

12. A system for selecting access nodes for broadcast, comprising:
    a processing node configured to:
       receive signal strength metrics associated with a plurality of access nodes and determine, based on the received signal strength metrics, a first signal strength criteria for each of a plurality of wireless devices;

select, from the plurality of wireless devices, those wireless devices for which the first signal strength criteria meets a first signal strength threshold;

determine, based on the first signal strength threshold, a second signal strength criteria for each of the plurality of access nodes and select, from the plurality of access nodes, a minimum number of access nodes that meet the first signal strength threshold and the second signal strength criteria;

transmit a multicast transmission from the selected access nodes to the selected wireless devices;

detect, based on the received signal strength metrics, a change in the selected wireless devices that requires re-selection of the access nodes and re-determining of the first signal strength criteria for each of the plurality of wireless devices;

re-select those wireless devices for which the re-determined first signal strength criteria meets a second signal strength threshold; and re-determine, based on the second signal strength threshold, the second signal strength criteria and re-select, from the plurality of access nodes, the minimum number of access nodes that meet the second signal strength threshold and the re-determined second signal strength criteria.

13. The system of claim 12, wherein the first signal strength criteria further comprises a sum of the signal strength metrics for each wireless device based on signals received by the wireless device from the plurality of access nodes.

14. The system of claim 12, wherein the second signal strength criteria further comprises a sum of the signal strength metrics for each access node based on the signals received by the wireless devices.

15. The system of claim 12, wherein the selected access nodes transmit the multicast transmission over a frequency shared by the plurality of access nodes.

16. The system of claim 12, wherein the processing node is further configured to:
determine the first signal strength criteria for each of the wireless devices based on the signal strength metrics received during a first time period.

17. The system of claim 12, wherein the processing node is further configured to:
instruct the transmission of a unicast transmission from the plurality of access nodes which are not selected.

18. The system of claim 12, wherein the processing node is further configured to:
instruct the transmission of a unicast transmission to the wireless devices which are not selected from among the plurality of wireless devices.

19. The system of claim 12, wherein the processing node is further configured to:
receive from a new wireless device signal strength metrics based on signals received by the new wireless device from the plurality of access nodes;
determine that a signal strength criteria for the new wireless device does not meet the first signal strength threshold;
re-determine the first signal strength criteria for each of the wireless devices based on the received signal strength metrics;
select from among the plurality of wireless devices and the new wireless device those wireless devices comprising a signal strength criteria which meets a third signal strength threshold;
re-determine the second signal strength criteria for each of the plurality of access nodes;
select a minimum number of the access nodes wherein the second signal strength criteria meets the third signal strength threshold for each of the selected wireless devices; and
transmit a multicast transmission from the selected access nodes to the selected wireless devices.

* * * * *